US008842083B2

(12) United States Patent
Kim et al.

(10) Patent No.: US 8,842,083 B2
(45) Date of Patent: Sep. 23, 2014

(54) TOUCH SCREEN AND MANUFACTURING METHOD THEREOF

(75) Inventors: Gap Young Kim, Seoul (KR); Hyun Min Na, Seoul (KR); Hyuk Jin Hong, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 669 days.

(21) Appl. No.: 13/129,362

(22) PCT Filed: Nov. 13, 2009

(86) PCT No.: PCT/KR2009/006668
§ 371 (c)(1),
(2), (4) Date: Aug. 3, 2011

(87) PCT Pub. No.: WO2010/056054
PCT Pub. Date: May 20, 2010

(65) Prior Publication Data
US 2011/0304568 A1  Dec. 15, 2011

(30) Foreign Application Priority Data

Nov. 14, 2008 (KR) ...................... 10-2008-0113678

(51) Int. Cl.
*G06F 3/041* (2006.01)
*H05K 1/00* (2006.01)
*H01B 1/00* (2006.01)
*H01B 1/12* (2006.01)
*G06F 3/045* (2006.01)

(52) U.S. Cl.
CPC ...................................... *G06F 3/045* (2013.01)
USPC ............................. 345/173; 174/258; 252/500

(58) Field of Classification Search
USPC ........................................................ 345/173
See application file for complete search history.

(56) References Cited

U.S. PATENT DOCUMENTS

| 7,404,915 B2* | 7/2008 | Goto et al. ..................... 252/500 |
| 2001/0018238 A1 | 8/2001 | Kim |
| 2003/0087119 A1 | 5/2003 | Iwabuchi et al. |
| 2004/0027339 A1 | 2/2004 | Schulz |
| 2006/0274048 A1* | 12/2006 | Spath et al. ................... 345/173 |
| 2008/0286587 A1* | 11/2008 | Ahner et al. .................. 428/469 |
| 2010/0108368 A1* | 5/2010 | Sato et al. ..................... 174/258 |

FOREIGN PATENT DOCUMENTS

| CN | 1350658 A | 5/2002 |
| CN | 1884618 A | 12/2006 |
| EP | 1220234 A1 | 7/2002 |
| JP | 2003-151366 A | 5/2003 |

(Continued)

OTHER PUBLICATIONS

Choi, J.H. et al. "Work function increase of indium—tin—oxide surfaces by atmospheric air plasma treatment with steady-state airflow" *J. Vac. Sci. Technol. A*, Sep./Oct. 2005, 23(5):1479-1482.

(Continued)

*Primary Examiner* — Charles V Hicks
(74) *Attorney, Agent, or Firm* — Saliwanchik, Lloyd & Eisenschenk

(57) ABSTRACT

A touch screen according to an embodiment of the present invention includes: a transparent conductive material deposited on the upper surface of a flexible plastic film; and a metal layer vacuum-deposited on the transparent conductive film. The embodiment of the invention can provide a highly flexible touch screen of which manufacturing process can be simplified, and a manufacturing method thereof.

20 Claims, 2 Drawing Sheets

(56) References Cited

FOREIGN PATENT DOCUMENTS

| | | |
|---|---|---|
| JP | 2003-197035 A | 7/2003 |
| JP | 2006-045315 A | 2/2006 |
| JP | 2008-080743 A | 4/2008 |
| KR | 10-2005-0028377 A | 3/2005 |
| KR | 10-2007-0009724 A | 1/2007 |
| WO | WO-00/70405 A1 | 11/2000 |

OTHER PUBLICATIONS

Kim. H.J. et al. "Properties of amorphous tin-doped indium oxide thin films deposited by $O_2$/Ar mixture ion beam-assisted system at room temperature" *Surface & Coatings Technology*, 2000, 131:201-205.

Supplementary European Search Report dated Feb. 27, 2013 in European Application No. 09826286.8, filed Nov. 13, 2009.

Office Action dated Aug. 25, 2011 in Korean Application No. 10-2008-0113678, filed Nov. 14, 2008.

Chinese Office Action dated Dec. 25, 2013 in Chinese Application No. 200980145573.0.

Chinese Office Action dated Jun. 20, 2014 in Chinese Application No. 200980145573.0.

* cited by examiner

TOUCH SCREEN AND MANUFACTURING METHOD THEREOF

CROSS-REFERENCE TO RELATED APPLICATION

This application is the U.S. national stage application of International Patent Application No. PCT/KR2009/006668, filed Nov. 13, 2009, which claims priority to Korean Application No. 10-2008-0113678, filed Nov. 14, 2008, the disclosures of each of which are incorporated herein by reference in their entirety.

TECHNICAL FIELD

The present invention relates to a touch screen and a method of manufacturing the same.

BACKGROUND ART

A touch screen is a device detecting approached or touched positions of fingers or a touch pen. The touch screen may be mounted on a screen of a video display device to easily input information.

The touch screen uses a transparent electrode to detect a touch input by fingers or a pen. The transparent electrode may be formed by wiring a metal layer on a transparent conductive oxide film such as indium tin oxide (ITO).

Generally, a screen printing technology of printing and drying metal wirings has been used to form wirings on the ITO film.

However, there is a problem in that the touch screen wiring process according to the related art is complicated. In addition, the touch screen wiring process according to the related art may make thickness of a metal layer thick. If the metal layer is thick, there are problems in that flexibility of the touch screen is weakened and the adhesion thereof is reduced.

DISCLOSURE OF INVENTION

An embodiment of the present invention is to provide a touch screen capable of providing excellent flexibility and simplifying a manufacturing process, and a method of manufacturing the same.

In an embodiment of the present invention, a touch screen is provided, the touch screen characterized by: a transparent conductive material deposited on a top surface of a flexible plastic film; and a metal layer vacuum-deposited on the transparent conductive film.

In another embodiment of the present invention, a method of manufacturing a touch screen is provided, the method characterized by: performing heat treatment for preventing an ITO film from shrinking; removing and pre-processing impurities on a surface of the ITO film; and depositing a metal layer on the pre-processed ITO film.

Advantageous Effects

According to the embodiment of the present invention, the touch screen and the method of manufacturing the same capable of providing the excellent flexibility and simplifying the manufacturing process can be provided.

BRIEF DESCRIPTION OF DRAWINGS

The above and other objects and features of the present invention will become apparent from the following description of preferred embodiments taken in conjunction with the accompanying drawings.

DETAILED DESCRIPTION

Hereinafter, a touch screen and a method of manufacturing the same according to an embodiment of the present invention will be described in detail with reference to the accompanying drawings. However, if it is determined that the detailed description of relevant known functions or components makes subject matters of the present invention obscure, the detailed description thereof will be omitted.

Figure 1:
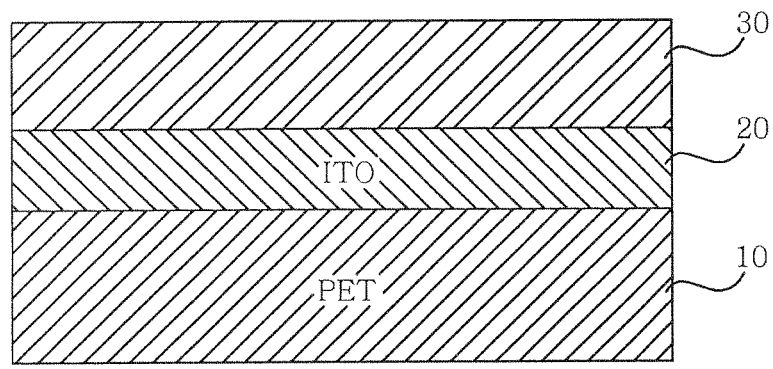
FIG. 1 is a cross-sectional view of a touch screen according to a first embodiment of the present invention.

FIG. 1 is a cross-sectional view of a touch screen according to a first embodiment of the present invention.

As shown in FIG. 1, the touch screen according to the first embodiment of the present invention includes a transparent conductive film 20 such as indium tin oxide, or the like, that is deposited on a top surface of the flexible plastic film 10 and a conductor layer 30 that is deposited on a transparent conductive film 20.

The flexible plastic film 10 may use a film made of PES, PC, PE, PI, Acryl, or the like, as a base. The embodiment of the present invention illustrates a case in which a polyethylene terephthalate (PET) film 10 is used. In this case, the PET film 10 has shrinkage characteristics in a range of 100 to 150° C. When the PET film 10 on which the transparent conductive film 20 is deposited is used to manufacture the touch screen, there is a problem in that an align is mismatched due to the shrinkage of the PET film 10 at the time of performing heat treatment for a bonding process of upper and lower plates.

Therefore, it is preferable to remove the shrinkage that may occur during a metal layer deposition process and a post-process by performing an annealing process that heat-treats the PET film 10 at about 150° C. for 90 minutes to shrink the film in advance.

The conductor layer 30 is deposited on the ITO film 20. When the touch screen is operated in a resistive or capacitive type, the surface of the ITO film 20 serves to detect touch and the conductor layer 30 is used as an electrode moving charges. Therefore, the conductor layer 30 is formed using a conductive metal having a resistance value lower than that of the ITO film 20. The conductor layer 30 may be formed by depositing metals having excellent conductivity such as Ag, Cu, Au, Al, or the like using a vacuum deposition technology such as RF sputter, DC sputter, CVD, or the like. Since the conductor layer 30 directly affects the sensitivity of the touch screen, the deposition metal and the thickness may be controlled so that a resistance value may be controlled to 0.1Ω/□ (square) or less.

Meanwhile, when the conductor layer 30 is deposited using the vacuum deposition technology, a pre-processing process of removing the impurities on the surface of the ITO film 20 using plasma or ion beams may be performed in order to improve the adhesion between the ITO film 20 and the conductor layer 30.

Figure 2:
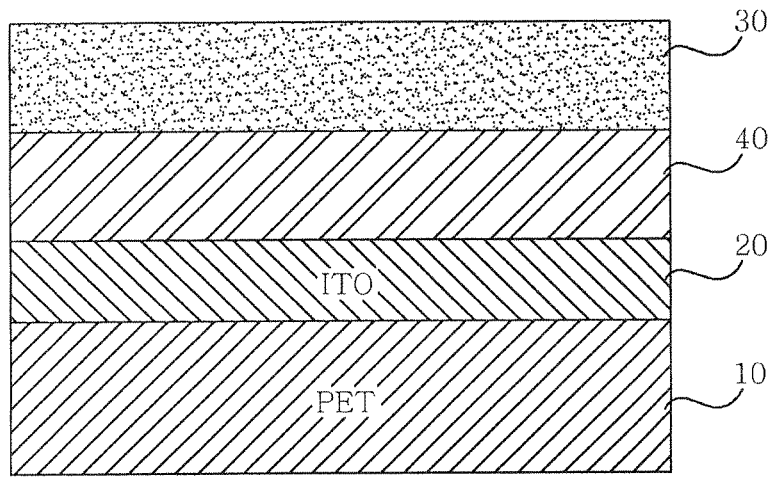
FIG. 2 is a cross-sectional view of a touch screen according to a second embodiment of the present invention.

FIG. 2 is a cross-sectional view of a touch screen according to a second embodiment of the present invention.

As shown in FIG. 2, the touch screen according to the second embodiment of the present invention may be used as a buffer layer 40 and a conductor layer 30 by forming the metal layer on the ITO film 20 deposited on the PET film 10 in a double layer.

When the metal layers 30 and 40 are deposited, after the surface of the ITO film 20 is pre-processed using a method such as plasma processing or ion beam irradiation and then, the metal layers 30 and 40 are deposited, such that the damage to the surface of the ITO film 20 may be prevented and the adhesion and the conductivity of the metal layers 30 and 40 may be improved.

The buffer layer 40 directly deposited on the ITO film 20 improves the adhesion between the ITO film 20 and the metal layers 30 and 40. Therefore, the buffer layer 40 may use a material such as Ni, Cr, Ni—Cr, Ti, Sn, Mo, or the like and the conductor layer 30 may select a material having excellent adhesion and conductivity with the buffer layer 40.

The buffer layer 40 directly deposited on the ITO film 20 improves the adhesion between the ITO film 20 and the metal layers. Therefore, the buffer layer 40 may use a material such as Ni, Cr, Ni—Cr, Ti, Sn, Mo, or the like and the conductor layer 30 may select a material having excellent adhesion and conductivity with the buffer layer 40.

The design conditions of the buffer layer 40 and the conductor layer 3 and the corresponding adhesion and conductivity are as the following Table 1.

TABLE 1

|  | Buffer Layer | Conductor Layer | Conductivity (Surface Resistance, $\Omega/\square$) | Adhesion (kgf/cm) |
| --- | --- | --- | --- | --- |
| Experiment 1 | Mo, 100□ | Ag, 800□ | 1.50 | 0.95 |
| Experiment 2 | Ni—Cr, 100□ | Ag, 800□ | 1.48 | 0.98 |
| Experiment 3 | Ni—Cr, 100□ | Cu, 1000□ | 1.10 | 0.97 |
| Experiment 4 | 0 | Ag, 1000□ | 0.88 | 0.3 |
| Experiment 5 | 0 | Cu, 1000□ | 0.94 | 0.34 |

As listed in the above-mentioned [Table 1], the Mo/Ag deposition ITO film 20 may be formed by depositing Mo on the buffer layer 40 at a thickness of 100 Å and Ag on the conductor layer 30 at a thickness of 800 Å. In this case, the conductivity and the adhesion are measured as 1.50$\Omega/\square$, 0.95 kgf/cm.

Further, the Ni—Cr/Ag deposition ITO film 20 may be formed by depositing Ni—Cr on the buffer layer 40 at a thickness of 100 Å and Ag on the conductor layer 30 at a thickness of 800 Å. In this case, the conductivity and the adhesion are measured as 1.48$\Omega/\square$, 0.98 kgf/cm.

The Ni—Cr/Cu deposition ITO film 20 may be formed by depositing Ni—Cr on the buffer layer 40 at a thickness of 100 Å and Cu on the conductor layer 30 at a thickness of 1000 Å. In this case, the conductivity and the adhesion are measured as 1.10$\Omega/\square$, 0.97 kgf/em.

Further, as shown in Experiment 4 and Experiment 5, when only the conductor layer 30 is formed, the conductivity and the adhesion are each measured as 0.88$\Omega/\square$, 0.3 kgf/cm and 0.94$\Omega/\square$, 0.34 kgf/cm.

As can be appreciated from the experimental results, when the buffer layer is formed, it can be appreciated that the adhesion may be remarkably improved.

Figure 3:
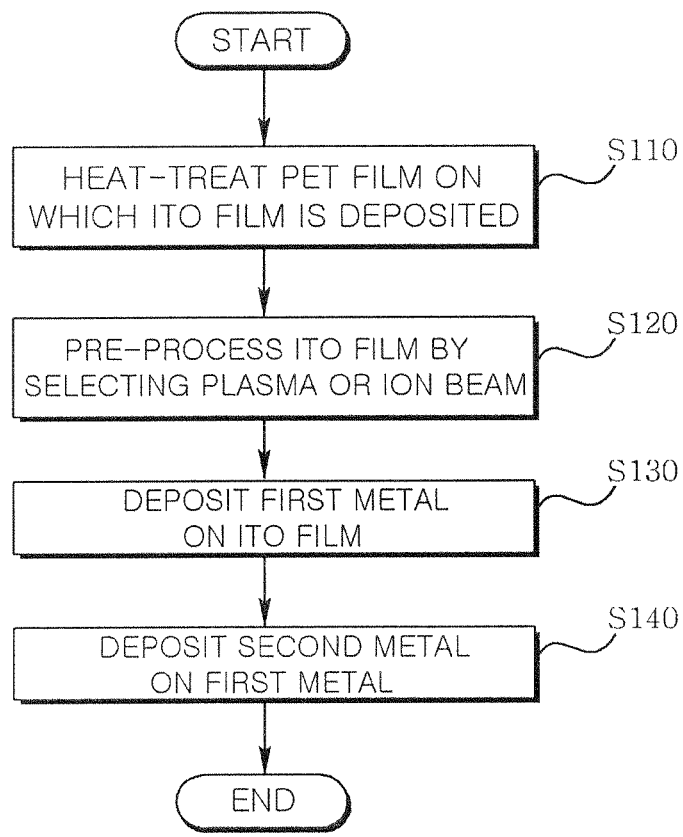
FIG. 3 is a flow chart of a method of manufacturing a touch screen according to an embodiment of the present invention.

FIG. 3 is a flow chart of a method of manufacturing a touch screen according to an embodiment of the present invention.

As shown in FIG. 3, when the touch screen is manufactured according to the embodiment of the present invention, the PET film 10 deposited with the ITO film 20 is heat-treated (S110).

The surface of the ITO film 20 is pre-processed by using the plasma or the ion beams (S120) in order to improve the adhesion of the metal layer. In this case, reactive gas for generating ion beams may be selected among $O_2$, $O_3$, $N_2$, $N_2O$, $NO_2$, and $CO_2$ and may be selected among inert gases such as Ar, Kr, Xe, and Ne. In addition, the reactive gas or the inert gas may be applied alone or in a mixing state. Further, the irradiation amount of the ion beams may be used within a range of $1\times10^{15}/cm^2 \sim 1\times10^{18}/cm^2$.

The first metal layer, the buffer layer 40 is deposited on the pre-processed ITO film 20 (S130). The buffer layer 40 may be formed by depositing a metal such as Ni, Cr, Ni—Cr, Ti, Sn, Mo, or the like by using a vacuum deposition method such as RF sputter, DC sputter, CVD technologies, or the like.

The second metal, the conductor layer 30 is deposited on the first metal layer (S140). The conductor layer 30 may be formed by depositing metals such as Ag, Cu, Au, Al, or the like using the vacuum deposition method such as RF sputter, DC sputter, CVD technologies, or the like.

While the invention will be described in conjunction with exemplary embodiments, it will be understood that present description is not intended to limit the invention to those exemplary embodiments. It will be apparent to those skilled in the art that various modifications and variation can be made in the present invention without departing from the spirit or scope of the invention. Thus, it is intended that the present invention cover the modifications and variations of this invention, provided they come within the scope of the appended claims and their equivalents.

INDUSTRIAL APPLICABILITY

The present invention can provide the touch screen capable of providing the excellent flexibility and simplifying the manufacturing process.

What is claimed is:

1. A touch screen, comprising:
    a transparent conductive layer on a substrate; and
    a metal layer including a buffer layer deposited directly on the transparent conductive layer and a conductor layer on the buffer layer, wherein the buffer layer comprises at least any one of Ni, Ni—Cr, Sn, and Mo.

2. The touch screen according to claim 1, wherein the substrate comprises a flexible plastic film including at least any one of PET, PES, PC, PE, PI, and Acryl.

3. The touch screen according to claim 1, wherein the conductor layer comprises at least any one of Ag, Cu, Au, and Al.

4. The touch screen according to claim 1, wherein the conductor layer comprises an electrode through which charge moves.

5. The touch screen according to claim 1, wherein adhesion between the metal layer and the transparent conductive material layer is in the range of 0.95 kgf/cm and 0.98 kgf/cm.

6. The touch screen according to claim 1, wherein surface resistance of the metal layer is in the range of 1.10$\Omega/\square$ and 1.50$\Omega/\square$.

7. The touch screen according to claim 1, wherein thickness of the buffer layer is in the range of ⅛ and 1/10 of that of the conductor layer.

8. The touch screen according to claim 1, wherein the conductor layer is disposed directly on the buffer layer.

9. The touch screen according to claim 1, wherein the buffer layer comprises Mo and the conductor layer comprises Ag.

10. A touch screen, comprising:
    a transparent conductive layer on a substrate; and
    a metal layer including a buffer layer deposited directly on the transparent conductive layer and a conductor layer on the buffer layer, wherein adhesion between the metal layer and the transparent conductive layer is in the range of 0.95 kgf/cm and 0.98 kgf/cm.

11. The touch screen according to claim 10, wherein surface resistance of the metal layer is in the range of $1.10\Omega/\square$ and $1.50\Omega/\square$.

12. The touch screen according to claim 10, wherein the buffer layer comprises Mo.

13. The touch screen according to claim 10, wherein the conductor layer comprises an electrode through which charge moves.

14. The touch screen according to claim 10, wherein thickness of the buffer layer is in the range of $1/8$ and $1/10$ of that of the conductive layer.

15. A touch screen, comprising:
  a transparent conductive layer on a substrate; and
  a metal layer including a buffer layer deposited directly on the transparent conductive layer and a conductor layer on the buffer layer, wherein surface resistance of the metal layer is in the range of $1.10\Omega/\square$ and $1.50\Omega/\square$.

16. The touch screen according to claim 15, wherein the buffer layer comprises Mo.

17. The touch screen according to claim 15, wherein the conductor layer comprises an electrode through which charge moves.

18. The touch screen according to claim 15, wherein thickness of the buffer layer is in the range of $1/8$ and $1/10$ of that of the conductor layer.

19. The touch screen according to claim 12, wherein the conductor layer comprises Ag.

20. The touch screen according to claim 16, wherein the conductor layer comprises Ag.

* * * * *